US008838063B2

(12) United States Patent
Park et al.

(10) Patent No.: US 8,838,063 B2
(45) Date of Patent: Sep. 16, 2014

(54) METHOD AND APPARATUS FOR PROVIDING EMERGENCY COMMUNICATION SERVICE IN A WIRELESS COMMUNICATION SYSTEM

(75) Inventors: Jung-Shin Park, Seoul (KR); Ji-Cheol Lee, Suwon-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 13/397,652

(22) Filed: Feb. 15, 2012

(65) Prior Publication Data

US 2012/0208488 A1 Aug. 16, 2012

(30) Foreign Application Priority Data

Feb. 15, 2011 (KR) .................. 10-2011-0013084

(51) Int. Cl.
*H04M 11/04* (2006.01)
*H04M 3/51* (2006.01)
*H04W 76/00* (2009.01)
*H04W 4/22* (2009.01)
*H04W 12/06* (2009.01)
*H04W 4/12* (2009.01)

(52) U.S. Cl.
CPC .............. *H04M 3/5116* (2013.01); *H04W 4/22* (2013.01); *H04W 12/06* (2013.01); *H04W 76/007* (2013.01); *H04W 4/12* (2013.01)
USPC .................... 455/404.1; 455/436; 455/452.2; 370/329; 370/332

(58) Field of Classification Search
USPC ................................ 455/436, 452.2; 370/329
See application file for complete search history.

(56) References Cited

U.S. PATENT DOCUMENTS

| 8,385,275 B2 * | 2/2013 | Shi et al. ........................ 370/329 |
| 2004/0203429 A1 * | 10/2004 | Anderson et al. .......... 455/67.11 |
| 2011/0149897 A1 * | 6/2011 | Youn et al. .................... 370/329 |
| 2012/0064854 A1 * | 3/2012 | Youn et al. ................. 455/404.1 |

* cited by examiner

*Primary Examiner* — Patrick Edouard
*Assistant Examiner* — Chuck Huynh (57) ABSTRACT

A method and apparatus providing an emergency communication service in a wireless communication system. A mobile station (MS) transmits a message requesting the emergency communication service to a base station (BS), receives a connection setup request message from the BS, the connection setup request message including a Service Flow Identifier (SFID) indicating that a service flow corresponding to the emergency communication service has been generated, a Flow Identifier (FID) between the BS and the MS for providing the emergency communication service, and an indicator indicating a connection request for the emergency communication service, performs a setup procedure for using the service flow based on the SFID, the FID, and the indicator and, upon completion of the setup procedure, transmits a data packet for the emergency communication service to the BS.

18 Claims, 7 Drawing Sheets

METHOD AND APPARATUS FOR PROVIDING EMERGENCY COMMUNICATION SERVICE IN A WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Feb. 15, 2011 and assigned Serial No. 10-2011-0013084, the contents of which are incorporated herein by reference.

TECHNICAL FIELD OF THE INVENTION

The present disclosure relates to a method and apparatus for providing an emergency communication service in a wireless communication system.

BACKGROUND OF THE INVENTION

The Institute of Electrical and Electronics Engineers (IEEE) 802.16m standard defines functions to support an emergency rescue service in the form of Enhanced 911 (E-911), a National Security/Emergency Preparedness (NS/EP) service, and an emergency alert message transmission service.

The emergency rescue service refers to a service of notifying a Public Safety Answering Point (PSAP) of an emergency rescue request or occurrence of an emergency in the event of natural disasters including earthquake, tsunami, etc. and man-made disasters including traffic accidents, rioting, etc.

The NS/EP service enables authorized NS/EP personnel to initiate emergency calls in a situation of terror or national security threats or an emergency related to national interest and protection of national leaders including the head of a nation.

The emergency alert message transmission service is a service in which in the event of natural or man-made disasters including war, accidents, etc., associated public institutions announce occurrence of such a disaster to general subscribers in order to protect and rescue individuals.

Conventionally, however, only limited access to the emergency rescue service is allowed, with no specified method for using the emergency alert message transmission service or the NS/EP service.

SUMMARY OF THE INVENTION

To address the above-discussed deficiencies of the prior art, it is a primary object to provide at least the advantages described below. Accordingly, an aspect of embodiments of the present disclosure is to provide a method and apparatus for providing an emergency communication service in a wireless communication system.

Another aspect of embodiments of the present disclosure is to provide a method and apparatus for enabling use of a National Security/Emergency Preparedness (NS/EP) service in a wireless communication system.

A further aspect of embodiments of the present disclosure is to provide a method and apparatus for enabling effective use of an NS/EP service in a wireless communication system.

In accordance with an embodiment of the present disclosure, there is provided a method for providing an emergency communication service at a Mobile Station (MS) in a wireless communication system, in which a message requesting the emergency communication service is transmitted to a Base Station (BS), a connection setup request message is received from the BS, the connection setup request message including a Service Flow Identifier (SFID) indicating that a service flow corresponding to the emergency communication service has been generated, a Flow Identifier (FID) between the BS and the MS for providing the emergency communication service, and an indicator indicating a connection request for the emergency communication service, a setup procedure for using the service flow is performed based on the SFID, the FID, and the indicator and, upon completion of the setup procedure, a data packet for the emergency communication service is transmitted to the BS.

In accordance with another embodiment of the present disclosure, there is provided a method for providing an emergency communication service at a BS in a wireless communication system, in which upon receipt of a message requesting the emergency communication service from an MS, a message requesting generation of a service flow for the emergency communication service is transmitted to a Base Station Controller (BSC), and upon receipt of a message indicating generation of the service flow from the BSC, a connection setup request message is transmitted to the MS, the connection setup request message including an SFID corresponding to the generated service flow, an FID between the BS and the MS for providing the emergency communication service, and an indicator indicating a connection request for the emergency communication service.

In accordance with another embodiment of the present disclosure, there is provided an MS for providing an emergency communication service in a wireless communication system, in which a transceiver communicates with a BS, a controller controls the transceiver to transmit a message requesting the emergency communication service to the BS and to receive a connection setup request message from the BS, the connection setup request message including an SFID indicating that a service flow corresponding to the emergency communication service has been generated, an FID between the BS and the MS for providing the emergency communication service, and an indicator indicating a connection request for the emergency communication service, and performs a setup procedure for using the service flow based on the SFID, the FID, and the indicator and, upon completion of the setup procedure, controlling the transceiver to transmit a data packet for the emergency communication service to the BS, and a memory stores the BR index, the SFID, the FID, and the indicator under control of the controller.

In accordance with a further embodiment of the present disclosure, there is provided a BS for providing an emergency communication service in a wireless communication system, in which a transceiver communicates with an MS and a BSC, a controller controls the transceiver to transmit a message requesting generation of a service flow for the emergency communication service to the BSC, upon receipt of a message requesting the emergency communication service from the MS through the transceiver, and upon receipt of a message indicating generation of the service flow from the BSC, controls the transceiver to transmit a connection setup request message to the MS, the connection setup request message including an SFID corresponding to the generated service flow, an FID between the BS and the MS for providing the emergency communication service, and an indicator indicating a connection request for the emergency communication service, and a memory stores the BR index, the SFID, the FID, and the indicator under control of the controller.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network. A detailed description of a generally known function and structure of the present disclosure will be avoided lest it should obscure the subject matter of the present disclosure.

Embodiments of the present disclosure provide a method and apparatus for providing an emergency communication service in a wireless communication system. More particularly, embodiments of the present disclosure provide a method and apparatus for enabling efficient use of a National. Security/Emergency Preparedness (NS/EP) service in a wireless communication system. While the following description is given in the context of an Institute of Electrical and Electronics Engineers (IEEE) 802.16m communication system being used as the wireless communication system, for clarity of description, it is purely exemplary. Thus it is to be clearly understood that the method and apparatus of the present disclosure is also applicable to other communication systems.

Before describing an embodiment of the present disclosure, a connection setup procedure for an emergency rescue service in a conventional wireless communication system will first be described below with reference to FIG. 1.

Figure 1:
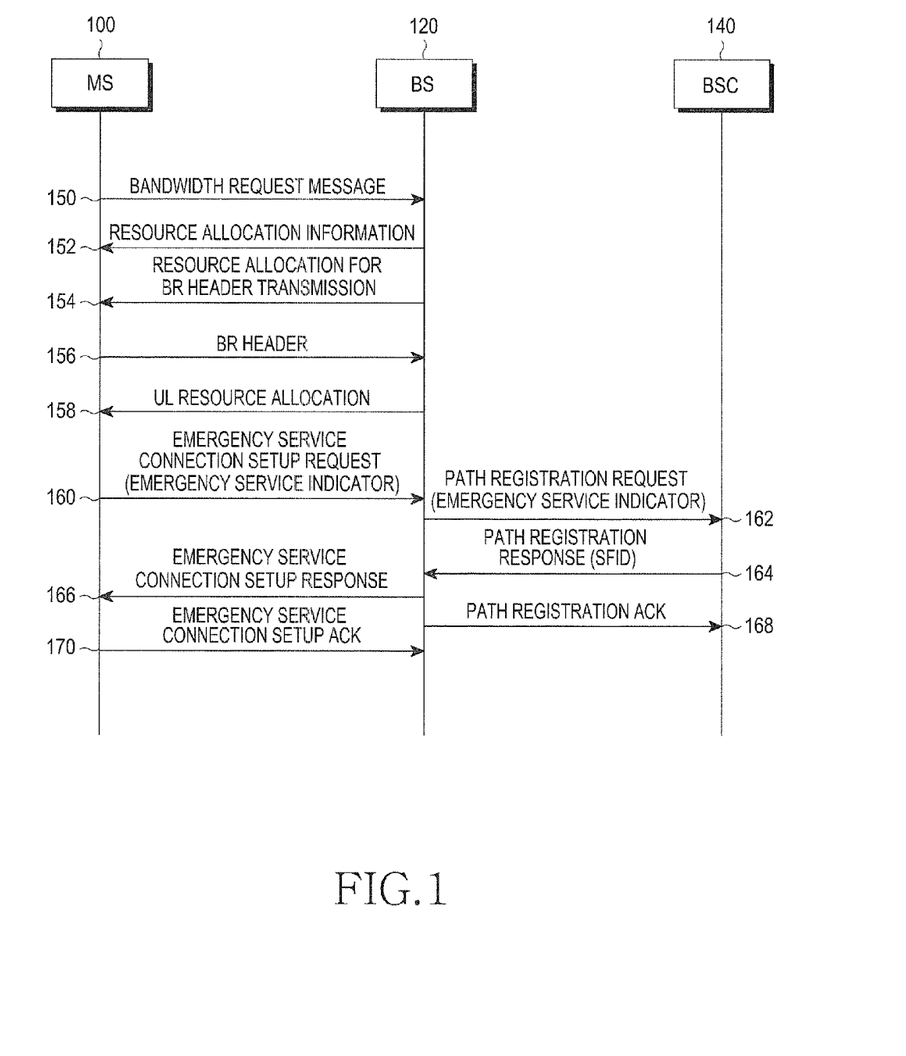
FIG. 1 illustrates a signal flow for a procedure for establishing a connection for an emergency rescue service in a conventional wireless communication system.

FIG. 1 illustrates a signal flow for a procedure for establishing a connection for an emergency rescue service in a conventional wireless communication system.

Referring to FIG. 1, the wireless communication system includes a Mobile Station (MS) 100, a Base Station (BS) 120, and a BS Controller (BSC) 140.

The MS 100 transmits a bandwidth request message (e.g. a Bandwidth Request (BR) Preamble Sequence) requesting allocation of an UpLink (UL) bandwidth to the BS 120 in step 150. Optionally, the MS transmits a quick access message requesting quick access to a network along with the bandwidth request message to the BS 120.

Upon receipt of the bandwidth request message, the BS 120 transmits resource allocation information (e.g. a BR ACKnowledgement (ACK) A-MAP Information Element (IE)) about the MS 100 to the MS 100 in step 152. In step 154, the BS 120 allocates resources to the MS 100 for transmission of a BR header.

The MS 100 transmits a BR header including information about the MS 100 and information about a required bandwidth to the BS 120 in the allocated resources in step 156. The information about the MS 100 includes a Station Identifier (STID). Then the BS 120 allocates UL resources to the MS 100 based on the information included in the BR header in step 158.

Upon completion of the initial network entry procedure in steps 150 to 158, the MS 100 performs a connection procedure to use the emergency rescue service (hereinafter, referred to as the emergency service). Specifically, the MS 100 transmits an emergency service connection setup request message including an emergency service indicator to the BS 120 in step 160. The emergency service indicator indicates that a connection needs to be set up for the emergency service. The emergency service connection setup request message may be, for example, an Advanced Air Interface-Dynamic Service Addition-Request (AAI-DSA-REQ) message.

Upon receipt of the emergency service connection setup request message, the BS 120 transmits a path registration request message including the information about the MS 100 and the emergency service indicator to the BSC 140 in step 162. Then the BSC 140 receives subscriber information associated with the emergency service from an authentication server and determines whether the MS 100 is authorized to use the emergency service based on the received subscriber information and the information about the MS 100.

If the MS 100 is authorized to use the emergency service, the BSC 140 transmits a path registration response message including a Service Flow Identifier (SFID) corresponding to the emergency service to the BS 120 in step 164.

Upon receipt of the path registration response message, the BS 120 determines that a service flow has been generated for the emergency service. Therefore, the BS 120 transmits an emergency service connection setup response message indicating that the emergency service is available to the MS 100 in step 166. The emergency service connection setup response message may be, for example, an Advanced Air Interface-Dynamic Service Addition-Response (AAI-DSA-RSP) message.

In step 168, the BS 120 transmits a path registration ACK message indicating reception of the path registration response message to the BSC 140. The MS 100 then transmits an emergency service connection setup ACK message indicating reception of the emergency service connection response message to the BS 120 in step 170.

When the above connection setup procedure for the emergency service is used for an NS/EP service, the following two functions may be provided. One of the functions is to enable an MS to request resource allocation for the NS/EP service using an initial access message, that is, a ranging request message (e.g. Advanced Air Interface-Ranging-Request (AAI-RNG-REQ)) during initial network entry.

The other function is to enable the MS to request resource allocation for the NS/EP service using a general connection setup request message (e.g. an AAI-DSA-REQ message in step 160 of FIG. 1 or an Advanced Air Interface-Dynamic Service Change-Request (AAI-DSC-REQ) message), when the MS intends to use the NS/EP service after the initial network entry is completed.

Conventionally, Quality of Service (QoS) parameters are preset for use in a service connection. Therefore, only when the QoS parameters are set, resource allocation for the NS/EP service can be requested during the initial network entry.

When the conventional emergency service connection setup procedure is used for the NS/EP service, information indicating that an NS/EP service connection needs to be established should be included in a ranging request message of an NS/EP service-requesting MS to which the NS/EP service is available during the initial network entry. Then the connection setup request from the NS/EP service-requesting MS may be given priority over connection setup requests received at the BS from other MSs. Accordingly, the condition of giving a highest access priority to the NS/EP service-requesting MS in an emergency which may be a requirement for the NS/EP service is satisfied.

However, after the initial network entry, the NS/EP service-requesting MS should transmit a service request by a general connection setup message. As a result, the time of giving priority is significantly delayed, compared to during the initial network entry.

Moreover, in the case where a plurality of MSs simultaneously request the emergency service and the NS/EP service, the emergency service can be prepared for simply by transmitting a bandwidth request message, whereas the NS/EP service cannot be performed until a general connection setup procedure (steps 160 to 170 in FIG. 1) is completed, in spite of the urgency of the NS/EP service request.

In this context, embodiments of the present disclosure provide an apparatus and method for enabling efficient provisioning of the NS/EP service.

Now a description will be given of the configuration of a wireless communication system according to an embodiment of the present disclosure.

Figure 2:
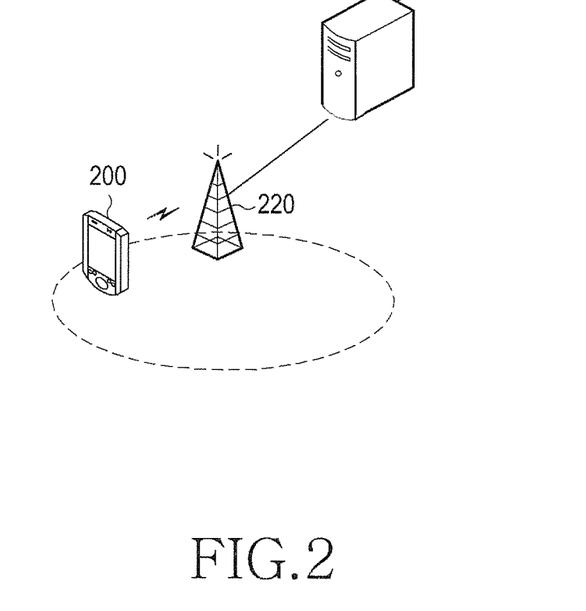
FIG. 2 illustrates the configuration of a wireless communication system according to an embodiment of the present disclosure.

FIG. 2 illustrates the configuration of a wireless communication system according to an embodiment of the present disclosure.

Referring to FIG. 2, the wireless communication system includes an MS 200, a BS 220, a BSC 240, and an authentication server (not shown).

The MS 200 operates to allow an NS/EP service subscriber to use the NS/EP service. Specifically, the MS 200 transmits an NS/EP service request to the BS 220, upon user request. That is, the MS 200 requests the NS/EP service to the BS 220 using a BR index set for the NS/EP service (hereinafter, referred to as an NS/EP-BR index) received from the BS 220 during initial network entry. When the MS 200 transitions to idle mode, it deletes the NS/EP-BR index. On the other hand, if the MS 200 returns to active mode, it may acquire an NS/EP-BR index in a similar manner to during the initial network entry.

When the MS 200 requests initial network entry or when the MS 200 transitions from the idle mode to the active mode and thus requests network reentry, the BS 220 transmits a message asking whether the MS 200 is authorized to use the NS/EP service to the BSC 240. Upon receipt of a message indicating that the MS 200 is authorized to use the NS/EP service from the BSC 240, the BS 220 transmits an NS/EP-BR index preset for the NS/EP service to the MS 200. Later, upon receipt of an NS/EP service request including the NS/EP-BR index from the MS 200, the BS 220 transmits a connection setup request message to the BSC 240 in order to provide the NS/EP service to the MS 200. Upon receipt of a message indicating that a service flow has been generated for the NS/EP service from the BSC 240, the BS 220 transmits information about the service flow to the MS 200 so that the MS 200 may use the NS/EP service.

Upon receipt of the message asking whether the MS 200 is authorized to use the NS/EP service from the BS 220, the BSC 240 determines whether the NS/EP service is available to the MS 200 using authentication information such as NS/EP subscriber information received from the authentication server and information about the MS 200 received from the BS 220. Then the BSC 240 transmits a message including the determination result to the BS 220. Upon receipt of the message requesting the NS/EP service for the MS 200 from the BS 220 later, the BSC 240 determines whether the MS 200 is authorized to use the NS/EP service based on the authentication information received from the authentication server. If the MS 200 is authorized to use the NS/EP service, the BSC 240 generates the service flow for the NS/EP service and transmits the message indicating generation of the service flow for the NS/EP service to the BS 220. In accordance with the embodiment of the present disclosure, the BSC 240 may be, for example, an Access Service Network Gateway (ASN GW).

The authentication server stores authentication information including NS/EP subscriber information, QoS profiles, and service class requirements and transmits the authentication information to the BSC 240, upon request of the BSC 240. For example, the authentication server may be an Authentication Authorization Accounting (AAA) server or a Policy Charging Rule Function (PCRF) server.

The configuration of an MS according to an embodiment of the present disclosure will be described with reference to FIG. 3.

Figure 3:
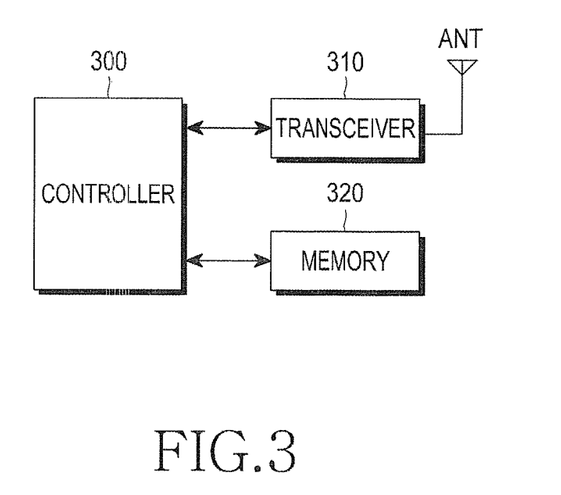
FIG. 3 illustrates a block diagram of a Mobile Station (MS) according to an embodiment of the present disclosure.

FIG. 3 illustrates a block diagram of an MS according to an embodiment of the present disclosure.

Referring to FIG. 3, the MS includes a controller 300, a transceiver 310, and a memory 320.

The controller 300 provides overall control to the MS and particularly controls the transceiver 310 and the memory 320. Especially, the controller 300 operates to allow a user to use the NS/EP service. To be more specific, the controller 300 performs later-described MS operations illustrated in FIGS. 5, 6 and 7.

The transceiver 310 is a component that performs wireless communication with a BS. The transceiver 310 receives a message from the BS and transmits a message to the BS.

The memory 320 stores various types of information required for operating the MS. Especially, the memory 320 stores NS/EP-BR index information, an NS/EP indicator, an SFID corresponding to the NS/EP service, and a Flow ID (FID) corresponding to a flow established with the BS, which are received from the BS.

Figure 4:
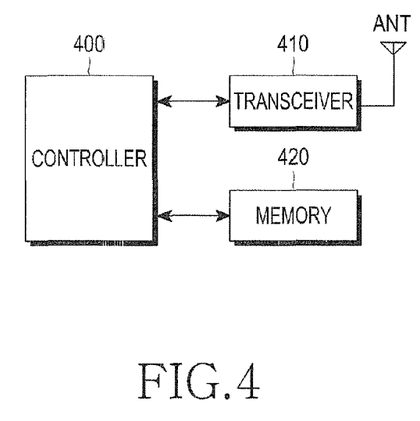
FIG. 4 illustrates a block diagram of a Base Station (BS) according to an embodiment of the present disclosure.

With reference to FIG. 4, the configuration of a BS according to an embodiment of the present disclosure will be described below.

FIG. 4 illustrates a block diagram of a BS according to an embodiment of the present disclosure.

Referring to FIG. 4, the BS includes a controller 400, a transceiver 410, and a memory 420.

The controller 400 provides overall control to the BS and particularly, controls the transceiver 410 and the memory 420. Especially, the controller 400 operates to enable an MS user to use the NS/EP service, upon request of an MS. Specifically, the controller 400 performs BS operations illustrated in FIGS. 5, 6 and 7, which will be described later.

The transceiver 410 is a component that wirelessly communicates with a BSC and the MS. The transceiver 410 receives messages from the BSC and the MS and transmits messages to the BSC and the MS. While the transceiver 410 is used for communication with the BSC according to the embodiment of the present disclosure, it may be further contemplated as another embodiment of the present disclosure that a separately procured physical component capable of communicating with the BSC is used for communication with the BSC.

The memory 420 stores various types of information required to operate the BS. Especially, the memory 420 stores NS/EP-BR index information received from the MS, an SFID and QoS parameters received from the BSC, a Mobile Station Identifier (MSID) corresponding to the MS, an NS/EP indicator, and an FID corresponding to a flow established with the MS.

Figure 5:
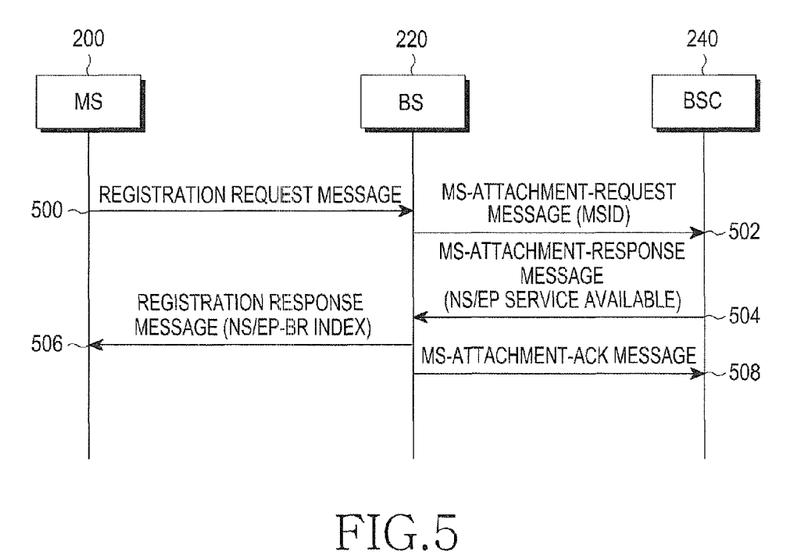
FIG. 5 illustrates a signal flow for a procedure for configuring National Security/Emergency Preparedness (NS/EP) service information during initial network entry of an MS in the wireless communication system according to an embodiment of the present disclosure.
Figure 6:
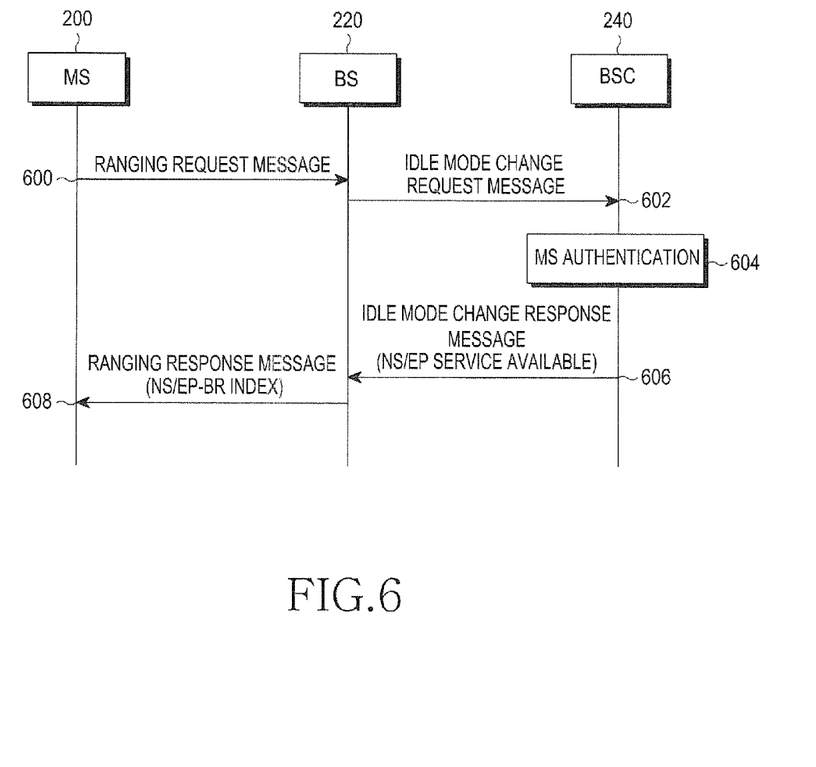
FIG. 6 illustrates a signal flow for a procedure for receiving an NS/EP-Bandwidth Request (BR) index at the MS in the wireless communication system, when the MS transitions from idle mode to active mode according to an embodiment of the present disclosure.
Figure 7:
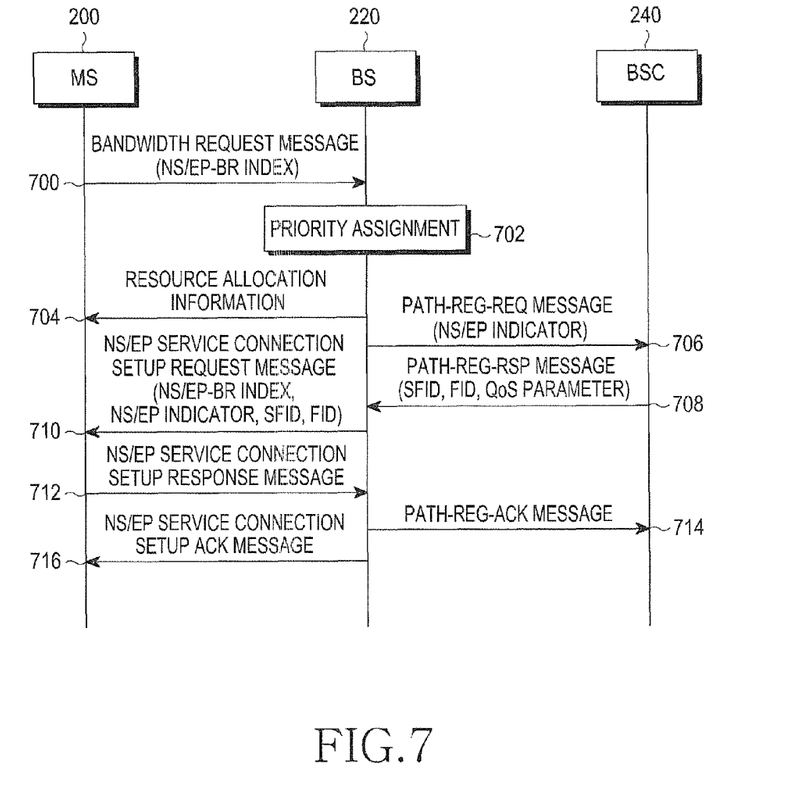
FIG. 7 illustrates a signal flow for a procedure for establishing a connection in an NS/EP service in the wireless communication system according to an embodiment of the present disclosure.

With reference to FIGS. 5, 6 and 7, a procedure for providing an NS/EP service in a wireless communication system according to an embodiment of the present disclosure will be described below.

A description will first be given of an operation for configuring NS/EP service information during initial network entry of an MS according to an embodiment of the present disclosure with reference to FIG. 5.

FIG. 5 illustrates a diagram illustrating a signal flow for a procedure for configuring NS/EP service information during initial network entry of an MS in the wireless communication system according to an embodiment of the present disclosure.

Referring to FIG. 5, the MS 200 transmits a registration request message to the BS 220 to perform initial network entry in step 500. The registration request message may be, for example, an Advanced Air Interface-Registration-Request (AAI-REG-REQ) message.

In step 502, the BS 220 transmits an MS-Attachment-Request message to the BSC 240 to handle the initial network entry of the MS 200. The MS-Attachment-Request message includes information about the MS 200, for example, an MSID.

The BSC 240 receives authentication information including subscriber information, QoS profiles, and service class requirements in relation to the NS/EP service from the authentication server. Then the BSC 240 determines whether the received authentication information includes NS/EP service subscriber information corresponding to the MSID. In the presence of the NS/EP service subscriber information corresponding to the MSID, the BSC 240 determines that the MS 200 is authorized to use the NS/EP service.

In step 504, the BSC 240 transmits to the BS 220 an MS-Attachment-Response message including information indicating that the MS 200 is authorized to use the NS/EP service. The BS 220 transmits a registration response message including an NS/EP-BR index to the MS 200 in step 506. The registration response message may be, for example, an Advanced Air Interface-Registration-Response (AAI-REG-RSP) message.

Upon receipt of the registration response message including the NS/EP-BR index, the MS 200 stores the NS/EP-BR index for future use in requesting the NS/EP service. In step 508, the BS 220 transmits an MS-Attachment-Ack message indicating that the MS 200 is capable of using the NS/EP service to the BSC 240 in step 508.

According to the embodiment of the present disclosure, when the MS 200 transitions to idle mode, the NS/EP-BR index is deleted. On the other hand, if the MS 200 transitions from the idle mode to active mode, the MS 200 may receive an NS/EP-BR index in a similar manner as during the initial network entry illustrated in FIG. 5.

Unless the serving BS is changed for the MS 200, an NS/EP-BR index identical to the previously stored NS/EP-BR index is transmitted to the MS 200. On the contrary, if the serving BS is changed for the MS 200, which means that the MS 200 has moved to another BS by handover, an NS/EP-BR index different from the previously stored NS/EP-BR index is transmitted to the MS 200.

With reference to FIG. 6, an operation for receiving an NS/EP-BR index at the MS 200 when the MS 200 transitions from the idle mode to the active mode will be described in detail.

FIG. 6 is a diagram illustrating a signal flow for a procedure for receiving an NS/EP-BR index at the MS in the wireless communication system, when the MS transitions from idle mode to active mode according to an embodiment of the present disclosure.

Referring to FIG. 6, when the MS 200 transitions from the idle mode to the active mode, the MS 200 transmits a ranging request message to the BS 220, for network reentry in step 600. The ranging request message may be, for example, an AAI-RNG-REQ message.

To handle the network reentry of the MS 200, the BS 220 transmits an idle mode change request message to the BSC 240 in step 602. The idle mode change request message indicates to the BSC 240 that the MS 200 has transitioned from the idle mode to the active mode. The idle mode change request message may be, for example, an IM_Exit_State_Change_Req message. The idle mode change request message may include information about the MS 200 (e.g. NS/EP subscriber information about the MS 200 and QoS information about an associated service flow).

The BSC 240 authenticates the MS 200 in step 604. More specifically, the BSC 240 receives authentication information including NS/EP subscriber information, QoS profiles, service class requirements, etc. from the authentication server in the process of handling the network reentry of the MS 200. Then the BSC 240 determines whether the received authentication information includes information corresponding to the information about the MS 200 included in the idle mode change request message.

In the presence of the information corresponding to the information about the MS 200 in the received authentication information, the BSC 240 determines that the MS 200 is authorized to use the NS/EP service. Then the BSC 240 transmits an idle mode change response message including information indicating that the MS 200 is authorized to use the NS/EP service to the BS 220 in step 606. The idle mode change response message may be, for example, an IM_Exit_State_Change_Rsp message.

In step 608, the BS 200 transmits a ranging response message including a preset NS/EP-BR index to the MS 200. The ranging response message may be, for example, an AAI-REG-RSP message.

Upon receipt of the ranging response message including the NS/EP-BR index, the MS 200 stores the BS/EP-BR index for future use in requesting the NS/EP service.

Now a description will be given of an operation for establishing a connection for the NS/EP service according to an embodiment of the present disclosure with reference to FIG. 7.

FIG. 7 illustrates a signal flow for a procedure for establishing a connection in an NS/EP service in the wireless communication system according to an embodiment of the present disclosure.

Referring to FIG. 7, when the MS 200 intends to provide the NS/EP service to a user after the initial network entry or the network reentry, the MS 200 transmits a bandwidth request message to the BS 220 in step 700. The bandwidth request message includes a BR index indicating a request for the NS/EP service, that is, an NS/EP-BR index. The MS 200 may transmit a quick access message together with the bandwidth request message to the BS 220 in step 700.

The BS 220 determines that the bandwidth request message is a request for the NS/EP service based on the NS/EP-BR index included in the bandwidth request message. Then the BS 220 assigns a highest priority level to the bandwidth request message including the NS/EP-BR index among all received bandwidth request messages in step 702. That is, the BS 220 prioritizes the NS/EP service request of the MS 200 so that the NS/EP service request of the MS 200 can be processed first of all.

Subsequently, the BS 220 broadcasts resource allocation information (e.g. a BR ACK A-MAP IE) including the NS/EP-BR index received from the MS 200 in order to notify the MS 200 that the bandwidth request message has been received successfully and an NS/EP service is being generated in step 704.

In step 706, the BS 220 transmits a Path-Reg-Req message to the BSC 240 to establish a new connection for the requested NS/EP service. The Path-Reg-Req message includes an NS/EP indicator indicating a connection request for the NS/EP service and information about the MS 200 (e.g. NS/EP subscriber information about the MS 200 and QoS information about an associated service flow).

The BSC 240 receives from the authentication server authentication information including subscriber information, QoS profiles, and service class requirements in relation to the NS/EP service and determines whether information corresponding to the information about the MS is included in the received authentication information. In the presence of the information corresponding to the information about the MS in the received authentication information, the BSC 240 determines that the MS 200 is authorized to use the NS/EP service.

The BSC 240 then approves the connection request for the NS/EP service and generates a new service flow according to preset QoS parameters. In step 708, the BSC 240 transmits to the BS 220 a Path-Reg-Rsp message including an SFID being the ID of the generated service flow and a QoS parameter corresponding to the service flow.

The BS 220 determines whether a service flow has been generated successfully at the BSC 240 by checking the information included in the Path-Reg-Rsp message, that is, the SFID and the QoS parameter. In the case of successful generation of the service flow, the BS 220 transmits to the MS 200 an NS/EP service connection setup request message including the NS/EP-BR index received from the MS 200, the NS/EP indicator, the SFID received from the BSC 240, and the FID of a flow between the BS 220 and the MS 220 in step 710. The NS/EP service connection setup request message may be, for example, an AAI-DSA-REQ or AAI-DSC-REQ message.

When a service flow procedure starts for a radio link for the NS/EP service requested by the MS 200 in the above manner, the MS 200 operates as follows. Upon receipt of the NS/EP service connection setup request message, the MS 200 determines that the BS 220 has initiated a procedure for generating a service flow for the requested NS/EP service. Then the MS 200 performs a setup procedure for using the service flow (hereinafter, referred to as a service flow setup procedure) using the information included in the NS/EP service connection setup request message.

In step 712, the MS 200 transmits an NS/EP service connection setup response message to the BS 220, notifying the BS 220 of successful completion of the service flow setup. The NS/EP service connection setup response message may be, for example, an AAI-DSA-RSP or AAI-DSC-RSP message.

Upon receipt of the NS/EP service connection setup response message from the MS 200, the BS 200 determines whether the service flow for the NS/EP service is available to the MS 200 based on information included in the NS/EP service connection setup response message. If the service flow for the NS/EP service is available to the MS 200, the BS transmits a Path-Reg-Ack message to the BSC 240 to complete the service flow setup procedure for the NS/EP service so that the MS 200 may use the service flow for the NS/EP service in step 714.

Subsequently, the BS 220 notifies the MS 200 of successful completion of the service flow setup procedure for the NS/EP service by transmitting an NS/EP service connection setup ACK message to the MS 200 in step 716. The NS/EP service connection setup ACK message may be, for example, an AAI-DSA-ACK or AAI-DSC-ACK message.

Upon receipt of the NS/EP service connection setup ACK message, the MS 200 may start to transmit data packets of the NS/EP service.

Figure 8:
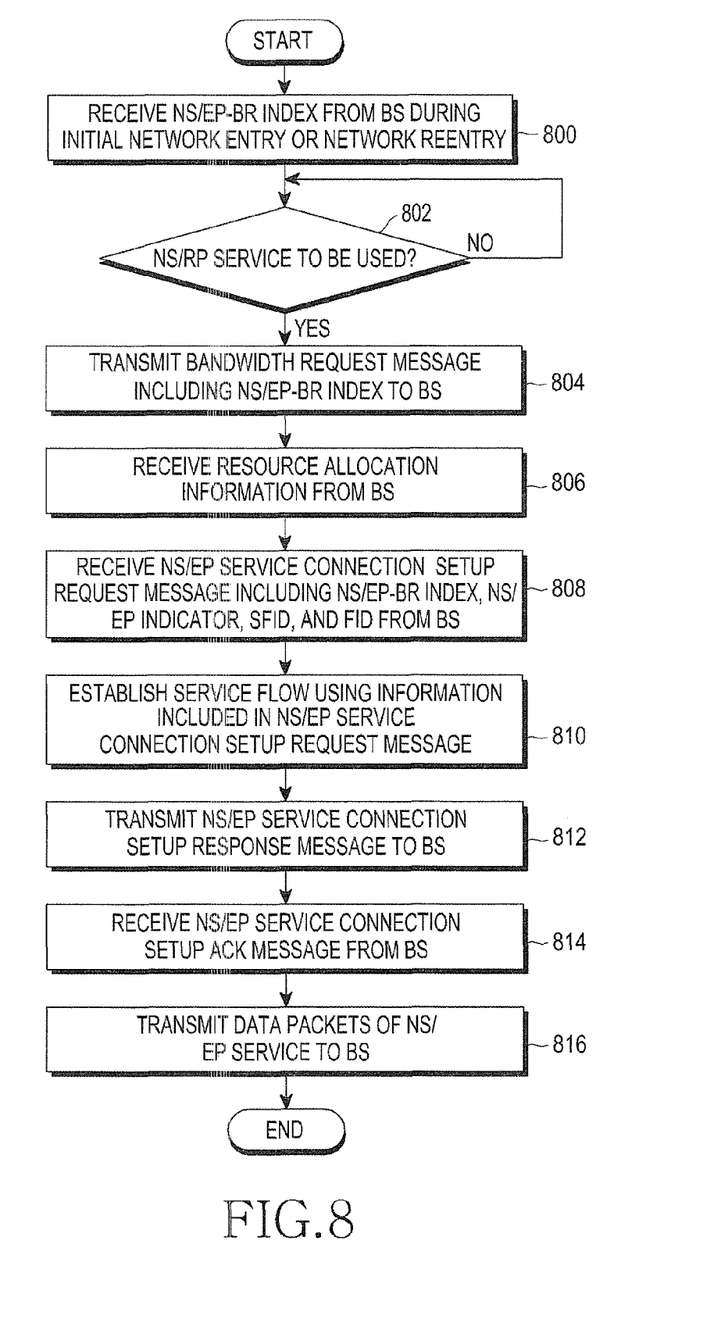
FIG. 8 illustrates a process of the MS for providing the NS/EP service in the wireless communication system according to an embodiment of the present disclosure.

With reference to FIG. 8, operation of the MS according to an embodiment of the present disclosure will be described.

FIG. 8 illustrates a process of an MS for providing the NS/EP service in the wireless communication system according to an embodiment of the present disclosure.

Referring to FIG. 8, the MS receives an NS/EP-BR index from the BS during initial network entry or network reentry in step 800. The NS/EP-BR index reception procedure may be performed in a manner similar to the description described before in detail with reference to FIGS. 3 and 4 and thus an additional detailed description is omitted for brevity.

In step 802, the MS determines whether to use the NS/EP service. When the MS determines to use the NS/EP service, the MS transmits a bandwidth request message including the NS/EP-BR index to the BS in step 804. Herein, the MS may transmit a quick access message together with the bandwidth request message to the BS.

The MS receives from the BS resource allocation information indicating that the bandwidth request message has been successfully received and an NS/EP service flow is being generated in step 806. The resource allocation information includes the NS/EP-BR index received from the MS.

Upon receipt of an NS/EP service connection setup request message including the NS/EP-BR index, an NS/EP indicator, an SFID, and an FID from the BS, the MS determines that a service flow procedure has started for a radio link for the NS/EP service in step 808. In addition, the MS determines that the BS has started a service flow generation procedure for the NS/EP service requested by the MS by receiving the NS/EP service connection setup request message.

Therefore, the MS sets up a service flow using the information included in the NS/EP service connection setup request message in step 810. That is, the MS performs the service flow setup procedure using the information included in the NS/EP service connection setup request message. Upon completion of the service flow setup procedure, the MS transmits an NS/EP service connection setup response message to the BS, indicating successful completion of the service flow setup procedure in step 812.

Upon receipt of an NS/EP service connection setup ACK message from the BS, the MS determines that the service flow setup procedure for the NS/EP service has been completed successfully in step 814 and transmits data packets of the NS/EP service to the BS in step 816.

Figure 9:
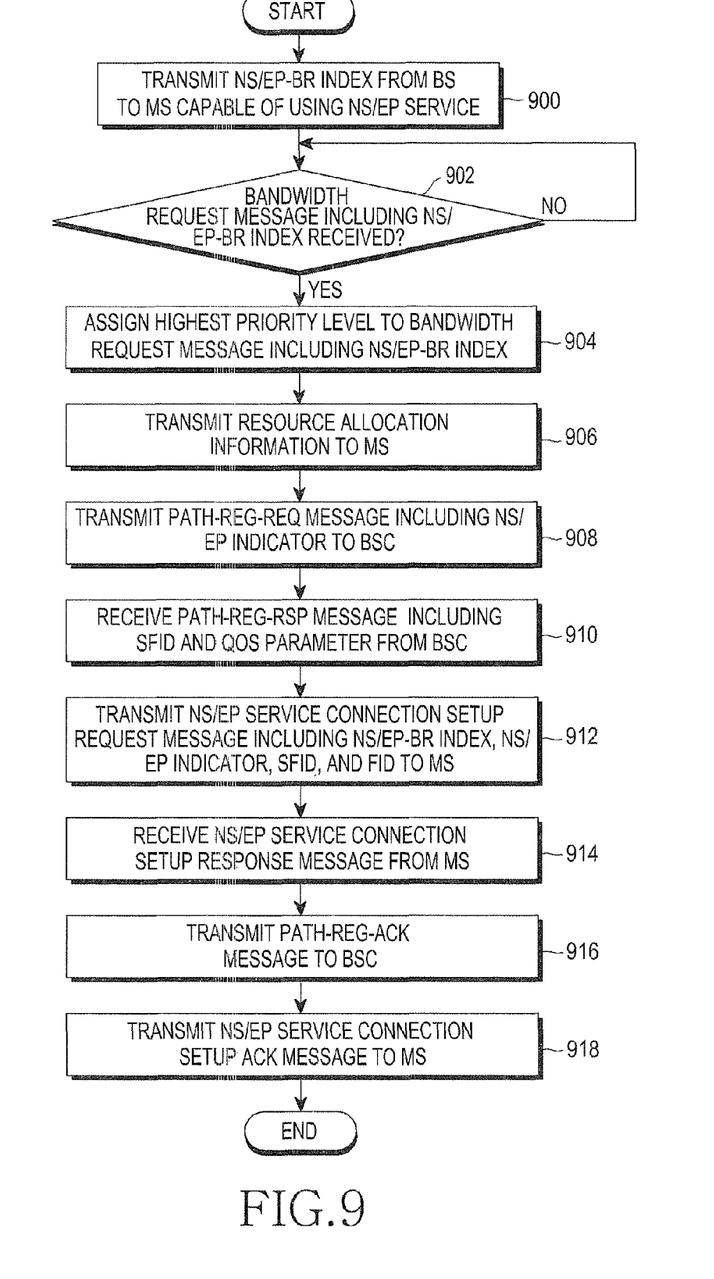
FIG. 9 illustrates a process of the BS for providing the NS/EP service in the wireless communication system according to an embodiment of the present disclosure.

With reference to FIG. 9, operation of the BS according to an embodiment of the present disclosure will be described below.

FIG. 9 illustrates a process of the BS for providing the NS/EP service in the wireless communication system according to an embodiment of the present disclosure.

Referring to FIG. 9, the BS 900 transmits an NS/EP-BR index to an MS capable of using an NS/EP service in step 900. The NS/EP-BR index transmission procedure may be performed during initial network entry or network reentry of the MS.

In step 902, the BS monitors reception of a bandwidth request message including the NS/EP-BR index from the MS. Upon receipt of the bandwidth request message including the NS/EP-BR index from the MS, the BS determines that the bandwidth request message requests the NS/EP service.

The BS then assigns a highest priority level to the bandwidth request message with the NS/EP-BR index among all received bandwidth request messages in step 904. Then the BS broadcasts resource allocation information including the NS/EP-BR index received from the MS in order to indicate to the MS that the bandwidth request message has been successfully received and an NS/EP service flow is being generated in step 906.

To establish a new connection for the NS/EP service, the BS transmits a Path-Reg-Req message to the BSC in step 908. The Path-Reg-Req message includes an NS/EP indicator indicating a connection request for the NS/EP service and information about the MS.

In step 910, upon receipt of a Path-Reg-Rsp message including an SFID corresponding to the NS/EP service and a QoS parameter for the NS/EP service from the BSC, the BS determines that the service flow has been successfully generated for the NS/EP service. Then the BS transmits an NS/EP service connection setup request message including the NS/EP-BR index, an NS/EP indicator, the SFID, and an FID to the MS in step 912.

The BS receives from the MS an NS/EP service connection setup response message indicating successful completion of a service flow setup at the MS in step 914.

The BS determines whether the service flow has been successfully generated for the NS/EP service at the MS based on information included in the NS/EP service connection setup response message. If the service flow has been successfully generated for the NS/EP service at the MS, the BS transmits a Path-Reg-Ack message to the BSC in order to complete the service flow setup procedure for the NS/EP service in step 916.

In step 918, the BS notifies the MS of successful completion of the service flow setup procedure for the NS/EP service by transmitting an NS/EP service connection setup ACK message to the MS.

As is apparent from the above description, the present disclosure enables effective use of an NS/EP service by minimizing the functions of a BS and a BSC such as a conventional ASN GW and additionally using a small number of parameters. In an emergency such as war or in a national interest-related emergency, the present disclosure enables stable use of the NS/EP service in spite of co-existent demands for other emergency services such as an emergency rescue service.

Furthermore, an NS/EP service request from an MS can be transmitted to a network differentially from other service requests in any traffic situation. As a result, the NS/EP service is given priority in resource allocation and thus it is fast provided. Without additional requirements for idle mode of the MS, the MS and the BSC can be readily implemented and an error probability is reduced in a complex signal process for handling the idle mode. Therefore, the NS/EP service can be used efficiently.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing an emergency communication service at a Mobile Station (MS) in a wireless communication system, the method comprising:
   receiving a Bandwidth Request (BR) index set for the emergency communication service from a Base Station (BS);
   deleting the BR index when the MS transitions to an idle mode, wherein the BR index is changed when the MS performs handover;
   transmitting a message requesting the emergency communication service using the BR index to the BS;
   receiving a connection setup request message from the BS, the connection setup request message including a Service Flow Identifier (SFID) indicating that a service flow corresponding to the emergency communication service has been generated, a Flow Identifier (FID) between the BS and the MS for providing the emergency communication service, and an indicator indicating a connection request for the emergency communication service;
   performing a setup procedure for using the service flow based on the SFID, the FID, and the indicator; and
   upon completion of the setup procedure, transmitting a data packet for the emergency communication service to the BS.

2. The method of claim 1, wherein the emergency communication service includes a National Security/Emergency Preparedness (NS/EP) service.

3. The method of claim 1, wherein the BR index is received based on whether the MS is authorized to use the emergency communication service.

4. The method of claim 1, wherein receiving the BR index comprises one of:
transmitting a registration request message to the BS and receiving a registration response message including the BR index from the BS, during initial network entry; and
transmitting a ranging request message to the BS and receiving a ranging response message including the BR index from the BS, during network reentry.

5. A method for providing an emergency communication service at a Base Station (BS) in a wireless communication system, the method comprising:
transmitting a Bandwidth Request (BR) index set for the emergency communication service to a Mobile Station (MS), wherein the BR index is deleted when the MS transitions to an idle mode and the BR index is changed when the MS performs handover;
transmitting a message requesting generation of a service flow for the emergency communication service to a Base Station Controller (BSC), upon receipt of a message requesting the emergency communication service using the BR index from the MS; and
transmitting a connection setup request message to the MS, upon receipt of a message indicating generation of the service flow from the BSC, the connection setup request message including a Service Flow Identifier (SFID) corresponding to the generated service flow, a Flow Identifier (FID) between the BS and the MS for providing the emergency communication service, and an indicator indicating a connection request for the emergency communication service.

6. The method of claim 5, wherein the emergency communication service includes a National Security/Emergency Preparedness (NS/EP) service.

7. The method of claim 5, wherein reception of the message requesting the emergency communication service from the MS comprises:
receiving a bandwidth request message including the BR index as the message requesting the emergency communication service from the MS.

8. The method of claim 7, wherein transmitting the BR index comprises one of:
requesting the BSC to check whether the MS is authorized to use the emergency communication service, upon receipt of a registration request message from the MS and transmitting a registration response message including the BR index to the MS, upon receipt of a message indicating that the MS is authorized to use the emergency communication service from the BSC; and
requesting the BSC to check whether the MS is authorized to use the emergency communication service, upon receipt of a ranging request message from the MS and transmitting a ranging response message including the BR index to the MS, upon receipt of a message indicating that the MS is authorized to use the emergency communication service from the BSC.

9. The method of claim 5, wherein the message requesting generation of a service flow includes the indicator, and the message indicating generation of the service flow includes the SFID and a Quality of Service (QoS) parameter corresponding to the emergency communication service.

10. A Mobile Station (MS) configured to provide an emergency communication service in a wireless communication system, the MS comprising:
a transceiver configured to communicate with a Base Station (BS);
a controller configured to:
control the transceiver to receive a Bandwidth Request (BR) index set for the emergency communication service from the BS, delete the BR index when the MS transitions to an idle mode, wherein the BR index is changed when the MS performs handover, transmit a message requesting the emergency communication service using the BR index to the BS, and receive a connection setup request message from the BS, the connection setup request message including a Service Flow Identifier (SFID) indicating that a service flow corresponding to the emergency communication service has been generated, a Flow Identifier (FID) between the BS and the MS for providing the emergency communication service, and an indicator indicating a connection request for the emergency communication service,
perform a setup procedure for using the service flow based on the SFID, the FID, and the indicator, and
upon completion of the setup procedure, control the transceiver to transmit a data packet for the emergency communication service to the BS; and
a memory configured to store the BR index, the SFID, the FID, and the indicator under control of the controller.

11. The MS of claim 10, wherein the emergency communication service includes a National Security/Emergency Preparedness (NS/EP) service.

12. The MS of claim 10, wherein the BR index is received based on whether the MS is authorized to use the emergency communication service.

13. The MS of claim 10, wherein the controller is further configured to control the transceiver to one of:
transmit a registration request message to the BS and to receive a registration response message including the BR index from the BS, during initial network entry; and
transmit a ranging request message to the BS and to receive a ranging response message including the BR index from the BS, during network reentry.

14. A Base Station (BS) configured to provide an emergency communication service in a wireless communication system, the BS comprising:
a transceiver configured to communicate with a Mobile Station (MS) and a BS Controller (BSC);
a controller configured to:
control the transceiver to transmit a Bandwidth Request (BR) index set for the emergency communication service to the MS, wherein the BR index is deleted when the MS transitions to an idle mode and the BR index is changed when the MS performs handover,
control the transceiver to transmit a message requesting generation of a service flow for the emergency communication service to the BSC, upon receipt of a message requesting the emergency communication service using the BR index from the MS through the transceiver, and upon receipt of a message indicating generation of the service flow from the BSC, and
control the transceiver to transmit a connection setup request message to the MS, the connection setup request message including a Service Flow Identifier (SFID) corresponding to the generated service flow, a Flow Identifier (FID) between the BS and the MS for providing the emergency communication service, and an indicator indicating a connection request for the emergency communication service; and a memory configured to store the BR index, the SFID, the FID, and the indicator under control of the controller.

15. The BS of claim 14, wherein the emergency communication service includes a National Security/Emergency Preparedness (NS/EP) service.

16. The BS of claim 14, wherein the controller is further configured to control the transceiver to receive a bandwidth request message including the BR index as the message requesting the emergency communication service from the MS.

17. The BS of claim 16, wherein:

upon receipt of a registration request message from the MS, the controller is further configured to request the BSC to check whether the MS is authorized to use the emergency communication service and control the transceiver to transmit a registration response message including the BR index to the MS, upon receipt of a message indicating that the MS is authorized to use the emergency communication service from the BSC; and upon receipt of a ranging request message from the MS, the controller is further configured to request the BSC to check whether the MS is authorized to use the emergency communication service and control the transceiver to transmit a ranging response message including the BR index to the MS, upon receipt of a message indicating that the MS is authorized to use the emergency communication service from the BSC.

18. The BS of claim 14, wherein the message requesting generation of a service flow includes the indicator, and the message indicating generation of the service flow includes the SFID and a Quality of Service (QoS) parameter corresponding to the emergency communication service.

* * * * *